United States Patent

Paulus et al.

(10) Patent No.: US 6,479,577 B1
(45) Date of Patent: Nov. 12, 2002

(54) AQUEOUS DISPERSION OF A MIXTURE OF A POLYURETHANE WITH A RADIATION-CURABLE (METH)ACRYLATE PREPOLYMER

(75) Inventors: Wolfgang Paulus, Ober-Olm (DE); Wolfgang Reich, Maxdorf (DE); Matthias Lokai, Enkenbach-Alsenborn (DE); Thomas Jaworek, Kallstadt (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 75 days.

(21) Appl. No.: 09/617,111

(22) Filed: Jul. 14, 2000

(30) Foreign Application Priority Data

Jul. 20, 1999 (DE) .......................... 199 33 826

(51) Int. Cl.⁷ .............................................. C08L 75/00
(52) U.S. Cl. ........................................ 524/507
(58) Field of Search ........................................ 524/507

(56) References Cited

U.S. PATENT DOCUMENTS

| 4,497,932 A | * | 2/1985 | Trovati ...................... 524/591 |
| 4,983,666 A | * | 1/1991 | Zavatteri .................... 524/539 |
| 5,306,764 A | * | 4/1994 | Chen .......................... 524/591 |
| 5,438,106 A | * | 8/1995 | Siranovich ................. 525/440 |
| 5,594,065 A | * | 1/1997 | Tien ........................... 524/507 |
| 5,977,215 A | * | 11/1999 | Tien ........................... 523/415 |
| 6,031,044 A |   | 2/2000 | Kokei et al. |

FOREIGN PATENT DOCUMENTS

| DE | 4031732 | 9/1992 |
| DE | 44 13 619 | 6/1995 |
| DE | 197 16 020 | 10/1998 |
| EP | 0 480 251 | 4/1992 |
| EP | 0 849 300 | 6/1998 |

* cited by examiner

*Primary Examiner*—Paul R. Michl
(74) *Attorney, Agent, or Firm*—Oblon, Spivak, McClelland, Maier & Neustadt, P.C.

(57) ABSTRACT

Aqueous dispersions of mixtures of (a) polyurethanes having hydrophilic groups which result in water dispersibility of the polyurethane and (b) radiation-curable (meth)acrylate prepolymers which are dilutable in at least 5% by weight of water, such as hydroxyl-containing polyether acrylates, are suitable, owing to their penetration behavior and their high solids absorption in paper, for use as radiation-curable coating or impregnating materials for paper substrates.

10 Claims, No Drawings

AQUEOUS DISPERSION OF A MIXTURE OF A POLYURETHANE WITH A RADIATION-CURABLE (METH)ACRYLATE PREPOLYMER

The present invention relates to aqueous dispersions which contain polyurethanes containing hydrophilic groups and radiation-curable (meth)acrylate prepolymers having limited water-dilutability, and to processes for their preparation and their use for coating substrates.

It is known that aqueous dispersions of radiation-curable resins can be used for coating or impregnating substrates. Thus, DE-C 4413619 discloses the use of mixtures of acrylate dispersions and melamine and/or urea resins for coating substrates in the production of finish films by coating impregnated or laminated substrates (referred to as paper having good internal bond strength). DE-C 4413619 proposes using, for the coating of such substrates, electron beam curable water-dilutable or water-soluble acrylates in the form of a dispersion, emulsion or solution, with which melamine and/or urea resins have preferably been mixed. DE-C 4413619 does not give any more detailed information about the acrylates or about embodiments. Substrates mentioned are those comprising paper, polyethylene terephthalate, polyolefins and polyvinyl chloride. After evaporation of the water and subsequent coating, the treated substrate is cured by means of electron beams. In DE-C 4413619, the object is to ensure that less water has to be treated in the production process and to reduce the drying capacity.

Aqueous dispersions of mixtures of polyurethanes having hydrophilic groups and radiation-curable acrylate resins, i.e. acrylate prepolymers for coating substrates, are known. Reference may be made in particular to DE-A 19716020 of the applicant. DE-A 19716020 describes aqueous dispersions which contain, in dispersed form, (a) a polyurethane which has hydrophilic groups or potentially hydrophilic groups for achieving water dispersibility but contains no C—C double bonds, and (b) a non-self-dispersible radiation-curable prepolymer containing from 0.1 to 1 mol of polymerizable double bonds per 100 g of prepolymer. The aqueous dispersions described in DE-A 19716020 and comprising mixtures of polyurethanes and (meth)acrylate prepolymers have a long shelf life and, on coating wood, exhibit sufficient hardness, adhesion and resistance to chemicals after UV curing, but, owing to their penetration behavior, are not particularly suitable for coating or impregnating paper substrates.

It is an object of the present invention to provide radiation-curable dispersions which, in addition to sufficient blocking resistance of the dried uncured film and good flexibility of the film after radiation curing, exhibit improved penetration behavior and higher polymer absorption into the paper during the coating of paper.

We have found that this object is achieved when radiation-curable (meth)acrylate prepolymers which have limited water dilutability are used or are concomitantly used in aqueous dispersions of mixtures of hydrophilic polyurethanes (A) and prepolymers (B). Preferably, the (meth)acrylate prepolymers having limited water dilutability should be dissolved both in the polyurethane phase and in the aqueous phase in the aqueous polyurethane dispersions.

The present invention thus relates to aqueous dispersions which are essentially free of protective colloids and emulsifiers and contain:

a) at least one polyurethane (A) having hydrophilic groups which result in water dispersibility of the polyurethane, the polyurethane (A) being essentially free of C—C double bonds capable of free radical polymerization, and b) at least one prepolymer (B) containing from 0.1 to 1 mol of C—C double bonds capable of free radical polymerization per 100 g of prepolymer, wherein the radiation-curable (meth)acrylate prepolymer (B) has a water dilutability of at least 5% by weight, based on the solids content of the (meth)acrylate prepolymer (B), of water.

The defining feature of the present invention is thus to use, in the aqueous dispersions of mixtures of polyurethanes (A) with prepolymers (B), radiation-curable (meth)acrylate prepolymers (B) having limited water dilutability, in particular those having hydrophilic groups and preferably hydroxyl groups. Preferred (meth)acrylate prepolymers (B) having limited water dilutability are dissolved both in the phases of the polyurethanes (A) and in the aqueous phase of the dispersions. For the prepolymers (B) used according to the invention, improved penetration behavior of the aqueous dispersions into the paper substrates as well as higher internal bond strength of the impregnated paper is achieved.

The (meth)acrylate prepolymers (B) should have limited water dilutability, the water dilutability being determined by adding small portions of defined amounts of water successively to the (meth)acrylate prepolymers (B) and mixing them in until the occurrence of permanent turbidity indicates that the water dilutability limit has been reached. Thus, the maximum amount of water which can be added and at which there is still no permanent turbidity is defined as the limit of water dilutability. In the case of the suitable (meth)acrylate prepolymers (B) according to the invention, at least 0.05 part of water per part of (meth)acrylate prepolymer (B) should still give homogeneous water mixtures, i.e. the (meth)acrylate prepolymer should be capable of being diluted with at least 5, in particular from 5 to 100, preferably from 10 to 100, particularly preferably from 20 to 50, % by weight, based on the solids content of the (meth)acrylate prepolymer (B), of water. This can be achieved by using one or more (meth)acrylate prepolymers which has or have the abovementioned water dilutability per se. Alternatively, it is possible to use a mixture which has the abovementioned water dilutability but contains one or more (meth)acrylate prepolymers which do not have this water dilutability per se. For example, such a mixture may contain one (or more) (meth)acrylate prepolymer(s) having said water dilutability and one (or more) (meth)acrylate prepolymer(s) whose water dilutability does not correspond to the abovementioned value. Alternatively, the mixture may also be formed from two or more (meth)acrylate prepolymers which have the above water dilutability only when mixed but not by themselves.

Among the commercial (meth)acrylate prepolymers used in the examples, the product Laromer® LR 8982 has a water dilutability limit of 20.4% by weight of water and the product Laromer® LR 8765 has a water dilutability limit of 38.7% by weight of water, based in each case on the solids content of the (meth)acrylate prepolymers. The product Laromer® PO 43F has a water dilutability limit of less than 3% by weight of water and is the only (meth)acrylate prepolymer not suitable for the preparation of the novel aqueous dispersions. However, it can be used as a mixture with another (meth)acrylate prepolymer (B) which has a water dilutability of at least 5% by weight. The preferably used (meth)acrylate prepolymers (B) ensure that the (meth)acrylates (B) are dissolved both in the polyurethane phase and in the aqueous phase of the aqueous dispersions, which is to be noted in particular at a water dilutability above 100% by weight of water.

Radiation-curable (meth)acrylate prepolymers (B) include reaction products known as radiation-curable acrylate resins and obtained from the reaction of (i) methacrylic and/or acrylic acid with (ii) polyesters, polyethers, polyurethanes containing at least 2 hydroxyl groups and epoxy resins having at least 2 functional groups reacting with (meth)acrylic acid, and reaction products of (i) hydroxyalkyl (meth)acrylates with (ii) isocyanate-containing compounds. Such radiation-curable acrylate resins are commercially available and are described, for example, in P.K.T. Oldring, Chemistry & Technology of UV & EB formulations for coatings, inks and paints, Vol. II: Prepolymers & Reactive Diluents, J. Wiley and Sons, New York and Sita Technology Ltd., London 1997, Depending on preparation and repeating structural units in the molecular chain, the (meth)acrylate prepolymers or acrylate resins are subdivided into polyester acrylates, polyether acrylates, urethane acrylates, epoxy acrylates and melamine acrylates and, as radiation-curable prepolymers, have a relatively low molecular weight. They have in general an average molecular weight $M_n$ of from 300 to 15,000, preferably from 400 to 3000, g/mol, determined by gel permeation chromatography (GPC) using polystyrene as standard and tetrahydrofuran as eluent. The (meth)acrylate prepolymers contain from 0.1 to 1.0, preferably from 0.1 to 0.5, mol of polymerizable C—C double bonds per 100 g of prepolymer. Very suitable (meth)acrylate prepolymers contain from 2 to 20, in particular from 2 to 10, preferably from 2 to 6, methacryloyl and/or acryloyl groups in the molecule. Particularly suitable among the (meth) acrylate prepolymers are those which are derived from polyfunctional aliphatic alcohols which, apart from the hydroxyl groups and., if desired, ether, ester and/or urethane groups, have no further functional groups. Examples of alcohols are dihydric and trihydric alcohols and alcohols having a higher functionality, such as proplyene glycol, diethylene glycol, triethylene glycol, butanediol, hexanediol, neopentylglycol, cyclohexanediol, glycerol, trimethylolpropane, di-trimethylolpropane, pentaerythritol, dipentaerythritol or sorbitol. For the preparation of polyester acrylates, predominantly aliphatic polyester polyols are suitable. Polyester acrylates can be prepared in one or more stages from polyols, polycarboxylic acids and (meth)acrylic acid. They are described, for example, in EP-A 279 303. For the preparation of the preferred polyether acrylates, alkoxylated, preferably ethoxylated, polyhydric alcohols, in which the degree of alkoxylation may be from 0 to 10 per hydroxyl group, are especially suitable. Polyether acrylates which contain $CH_2$—$CH_2$—O structural units and additionally free hydrophilic groups and, as such, preferably hydroxyl groups are preferred, for example polyether acrylates which contain free hydroxyl groups and are derived from ethoxylated glycerol.

The novel aqueous dispersions are essentially free of protective colloids and emulsifiers and, in addition to the radiation-curable (meth)acrylate prepolymers (B), contain polyurethanes (A) which have hydrophilic groups and are thus water-dispersible. The polyurethanes (A) are essentially free of C—C double bonds. Regarding the type of polyurethanes, their preparation and the method of preparation of the aqueous dispersions of the polyurethanes (A) and of the (meth)acrylate prepolymers (B), reference is especially made to the corresponding information in DE-A 19716020, which is hereby incorporated by reference. Accordingly, the polyurethane (A) is composed of a) diisocyanates of 4 to 30 carbon atoms,
b) diols, of which
   b1) from 10 to 100 mol %, based on the total amount of the diols b), have a molecular weight of from 500 to 5000 and
   b2) from 0 to 90 mol %, based on the total amount of the diols b), have a molecular weight of from 60 to 500 g/mol.
c) starting materials which differ from the compounds a) and b) and have at least one isocyanate group or at least one group reactive toward isocyanate groups, which moreover carry at least one hydrophilic group or potentially hydrophilic group and contribute to water dispersibility of the polyurethanes (A),
d) if required, further polyfunctional compounds different from the compounds a) to c) and having reactive groups which are alcoholic hydroxyl groups, primary or secondary amino groups or isocyanate groups, and
e) if required, monofunctional compounds differing from the starting materials a) to d) and having a reactive group which is an alcoholic hydroxyl group, a primary or secondary amino group or an isocyanate group.

Preferably, the proportion of the diisocyanates a) among the starting materials a) to e) is from 20 to 70% by weight.

Examples of suitable diisocyanates a), diols b) and starting materials c) and d) are the compounds stated in DE-A 19521500 as starting materials a), b), c) and d).

The expression "(potentially) hydrophilic groups" includes, for the starting materials c), hydrophilic groups and potentially hydrophilic groups, "potentially hydrophilic groups" being understood as meaning nonionic and preferably ionic groups which can be readily converted, for example by neutralization or salt formation) into hydrophilic groups. The (potentially) hydrophilic groups of the starting materials c) react with isocyanate groups substantially more slowly than those functional groups of the starting materials c) which serve for building up the main chain of the molecule. The amount of the components having (potentially) hydrophilic groups is in general such that the molar amount of the (potentially) hydrophilic groups is from 80 to 1200, preferably from 140 to 1000, particularly preferably from 200 to 800, mmol/kg, based on the total amount of the starting materials a) to e). For the starting materials c), the content of nonionic hydrophilic groups among the (potentially) hydrophilic groups is preferably kept at from 0 to 5, more preferably 0–3, particularly preferably from 0 to 1, % by weight, based on the weight of the starting materials a) to e). In the preferred embodiment, the starting materials for the preparation of the polyurethanes (A) contain no C—C double bonds, and the polyurethane (A) is generally essentially free of C—C double bonds.

The starting materials a) to e) used usually carry from 1.5 to 2.5, preferably from 1.9 to 2.1, particularly preferably 2.0, isocyanate groups or functional groups capable of undergoing an addition reaction with isocyanates, said values being arithmetic means. The polyaddition reaction generally takes place at from 20 to 180° C., preferably from 50 to 150° C., under atmospheric or autogenous pressure, it being possible for conventional catalysts to be present for acceleration, such as tin(II) octanoate, dibutyltin dilaurate or diazabicyclo [2.2.2] octane.

Solvents suitable for this purpose are water-miscible solvents which have a boiling point of from 40 to 100° C. at atmospheric pressure and react very slowly, if at all, with the starting materials or any intermediates in the polyurethane preparation. The solvents are at least predominantly removed from the dispersion, in particular at reduced pressure, so that the dispersions are then free of solvents.

Preparation of the dispersions can be carried out as stated in DE-A 19716020, in particular by the "acetone process" or the "polyurethane prepolymer mixing process", the "polyurethane prepolymer mixing process" being preferred for the preparation of the novel aqueous dispersions of the polyurethanes (A) and (meth)acrylate prepolymers (B). In the "acetone process", an ionic polyurethane is prepared from the starting materials a) to e) in a water-miscible organic solvent boiling at below 100° C. under atmospheric pressure. Preferably after addition of the (meth)acrylate prepolymer (B), water is then added after neutralization of the product, which can be effected with sodium hydroxide solution or potassium hydroxide solution, until the formation of a dispersion having a coherent aqueous phase. In the "polyurethane prepolymer mixing process", instead of a reacted (potentially) ionic polyurethane being prepared in one step, only an isocyanate-containing polyurethane prepolymer (A') is prepared in the first step. Before or after this polyurethane prepolymer (A') is dispersed in water after neutralization, preferably before said dispersing the (meth)acrylate prepolymer (B) can be mixed with the polyurethane prepolymer (A') or reacted polyurethane, preferably in the absence of a solvent. During or after the dispersing, the isocyanate-containing polyurethane prepolymer (A') is crosslinked or subjected to chain extension by addition of amines, or the isocyanate groups are allowed to hydrolyze in water to give amino groups, which then react with isocyanate groups still present. The prepolymer (B) can, however, be stirred into the dispersed polyurethane (A) only shortly before the use of a dispersed mixture (A+B). The novel aqueous dispersions have in general a solids content of from 20 to 70, in particular from 35 to 60, preferably from 35 to 45, % by weight. They are essentially free of protective colloids and/or emulsifiers. The aqueous dispersions are readily miscible with other dispersions.

The novel aqueous dispersions of the mixtures of the polyurethanes (A) and the (meth)acrylate prepolymers (B) are very particularly suitable for impregnating or coating paper substrates, such as decorative papers. As shown in the examples below, they have a surprisingly short penetration time and high plastics absorption during the impregnation of commercial decorative paper and impart high internal bond strength to the papers.

The coating or impregnating of the paper substrate is achieved in a conventional manner by treating the paper substrate with the aqueous dispersions of the polyurethanes (a) and the (meth)acrylate prepolymer (B). the thus treated paper is usually treated with high-energy radiation (photo curing), e. g.

UV-radiation or electron beams, preferably UV-radiation having wavelength ranging from 200 to 450 nm and preferably from 220 to 390 nm. Therefore the (meth)acrylate prepolymers are crosslinked, thus effecting the curing of the plastics absorbed to the paper substrate. For the purpose of photo curing the aqueous dispersion may contain customary photoinitiators, such as aromatic ketone compounds, e. g. benzophenone, alkylbenzophenones, Micheler's ketone, anthrone, halogenated benzophenones, 2,4,6-trimethyl benzoylphosphine oxide, phenylglyoxylic esters, anthraquinone and its derivatives, benzil ketals, hydroxyalkylphenones, etc. or mixtures of these compounds. The amount of photoinitiators is generally from about 0.01 to 20% by weight, based on the amount of component B.

The examples and the comparative experiment which follow illustrate the invention without restricting it. Unless especially stated otherwise, parts and percentages are by weight. Stated viscosities (mPa·s) were determined at 23° C. according to DIN EN ISO 3219 at velocity gradient D=250 s$^{-1}$. The stated particle sizes were analyzed with the aid of photon correlation spectroscopy (Coulter N4/MD).

EXAMPLE 1

125.9 parts of a polyester diol of equimolar amounts of adipic acid and isophthalic acid and 1,6-hexanediol, having a molecular weight of 2000, 28.28 parts of dimethylolpropionic acid, 37.12 parts of ethylene glycol and 157.3 parts of a commercial isomer mixture of tolylene diisocyanate (about 80% of 2,4- and 20% of 2,6-isomers) were reacted for 4.5 hours at 80° C. in 202 parts of methyl ethyl ketone. Thereafter, the polyurethane prepolymer solution was diluted with 246 parts of acetone and cooled to 50° C. The isocyanate content of the polyurethane prepolymer was 0.30% at this time. 119 parts of Laromer® LR 8982 (low-viscosity modified polyether acrylate, viscosity 200–350 mPa·s, water dilutability 20.4%) were added and were stirred in for 10 minutes. Thereafter, 25.3 parts of a 25% strength aqueous sodium hydroxide solution and immediately thereafter 714 parts of demineralized water were added. The solvent was then distilled off. A translucent aqueous dispersion having a solids content of 39.7, a pH of 6.60, a particle size of 38.2 nm and a viscosity of 29 mPa·s was formed.

A 25% strength dispersion liquor was produced with the dispersion thus prepared and commercial decorative paper (from Kämmerer) was impregnated with said liquor (2 bar nip pressure, paper speed: 2 m/minute, dispersion liquor: 25%). The percentage plastics absorption of the paper after impregnation was determined and, as the penetration time, the time required by the decorative paper to become completely impregnated by a 25% strength dispersion liquor. The results of the determinations are shown in Table 1.

EXAMPLE 2

The procedure was as in Example 1, except that 221.9 parts of Laromer® LR 8982 and 27.4 parts of a 25% strength aqueous sodium hydroxide solution were added. As stated in Example 1, the percentage plastics absorption with a 25% strength dispersion liquor in the decorative paper and the penetration time were determined. The results are shown in Table 1.

EXAMPLE 3

The procedure was as in Example 1, except that 110.9 parts of Laromer® LR 8982 and 110.9 parts of Laromer® PO 43F (polyether acrylate, water dilutability less than,3%) were used as (meth)acrylate prepolymer. Neutralization was effected with 27.4 parts of a 25% strength aqueous sodium hydroxide solution. As stated in Example 1, the percentage plastics absorption with a 25% strength dispersion liquor in the decorative paper and the penetration time were determined. The results are shown in Table 1.

EXAMPLE 4

(Comparison)

269.7 parts of the polyester diol stated in Example 1 and having a molecular weight of 2000, 60.6 parts of dimethylolpropionic acid, 79.5 parts of ethylene glycol and 337 parts of the tolylene diisocyanate isomer mixture stated in Example 1 were reacted in 430 parts of methyl ether ketone at 80° C. for 4.5 hours. Thereafter, the polyurethane prepolymer solution was diluted with 246 parts of acetone and cooled to 50° C. The polyurethane prepolymer had an isocyanate content of 0.3% at this time. Thereafter, 253.5 parts of Laromer® PO43F (polyether acrylate, water dilutability less than 3%) were added and were stirred in for 10 minutes. After the addition of 54.3 parts of a 25% strength aqueous sodium hydroxide solution, 1494 parts of demineralized water were immediately mixed in. The solvent was then distilled off. A translucent aqueous dispersion having a solids content of 39%, a pH of 7.43, a particle size of 44.2 nm and a viscosity of 65 mPa·s was formed. As stated in Example 1, the plastics absorption with a 25% strength dispersion liquor in decorative paper and the penetration time were determined. The results are shown in Table 1.

We claim:

1. An aqueous dispersion which is essentially free of protective colloids and emulsifiers and contains:
   a) polyurethanes (A) having hydrophilic groups which result in water dispersibility of the polyurethane, the polyurethane (A) being essentially free of C—C double bonds, and
   b) (meth)acrylate prepolymers (B) containing from 0.1 to 1 mol of C—C double bonds capable of free radical polymerization per 100 g of prepolymer,
wherein the (meth)acrylate prepolymers (B) have a water dilutability of at least 5% by weight, based on the solids content of the (meth)acrylate prepolymers (B), of water.

2. An aqueous dispersion as claimed in claim 1, wherein the (meth)acrylate prepolymers (B) have a water dilutability of from 5 to 100% by weight, based on the solids content of the (meth)acrylate prepolymers (B), of water.

3. An aqueous dispersion as claimed in claim 1, wherein the (meth)acrylate prepolymers (B) have a water dilutability of from 20 to 50% by weight, based on the solids content of the (meth)acrylate prepolymers (B), of water.

4. An aqueous dispersion as claimed in claim 1, wherein the (meth)acrylate prepolymers (B) are polyether acrylates containing hydrophilic groups.

5. An aqueous dispersion as claimed in claim 1, wherein the (meth)acrylate prepolymers (B) are polyether acrylates containing hydroxyl groups and —$CH_2$—$CH_2$—O structural units.

6. An aqueous dispersion as claimed in claim 1, wherein the weight ratio of polyurethane (A) to (meth)acrylate prepolymer (B) is from 0.3:1 to 10:1.

7. An aqueous dispersion as claimed in claim 1, wherein the polyurethane (A) is composed of
   a) diisocyanates of 4 to 30 carbon atoms,
   b) diols, of which
      b1) from 10 to 100 mol % of the diols b)+b2) have a molecular weight of from 500 to 5000 g/mol and
      b2) from 0 to 90 mol % of the diols b)+b2) have a molecular weight of from 60 to 500 g/mol,
   c) compounds which differ from the compounds a) and b) and have at least one isocyanate group or one group reacting with isocyanate groups, which additionally contain at least one hydrophilic or potentially hydrophilic group and impart water dispersibility to the polyurethanes,
   d) if required, further polyfunctional compounds differing from the compounds a) to c) and having reactive alcoholic hydroxyl groups, primary and/or secondary amino groups or isocyanate groups and
   e) if required, further monofunctional compounds differing from the compounds a) to d) and having at least one reactive alcoholic hydroxyl group, primary and/or secondary amino group or isocyanate group.

8. The method of treating a paper substrate, the method comprising the coating or impregnating of the paper substrate with an aqueous dispersion as defined in claim 1.

9. The method of claim 8, additionally comprising curing of the treated paper substrate with high-energy radiation.

10. The method of preparing a radiation-curable paper substrate by coating or impregnating a paper substrate with an aqueous dispersion as defined in claim 1.

* * * * *